(12) United States Patent
Kilgard et al.

(10) Patent No.: US 7,782,334 B1
(45) Date of Patent: Aug. 24, 2010

(54) PIXEL SHADER-BASED DATA ARRAY RESIZING

(75) Inventors: Mark J. Kilgard, Austin, TX (US); Jason R. Allen, Austin, TX (US)

(73) Assignee: NVIDIA Corporation, Santa Clara, CA (US)

( * ) Notice: Subject to any disclaimer, the term of this patent is extended or adjusted under 35 U.S.C. 154(b) by 440 days.

(21) Appl. No.: 11/225,481

(22) Filed: Sep. 13, 2005

(51) Int. Cl.
*G09G 5/00* (2006.01)

(52) U.S. Cl. .................... 345/582; 345/552; 345/592; 345/543; 345/419; 345/426

(58) Field of Classification Search ............... 345/582, 345/552, 592, 543, 419–426
See application file for complete search history.

(56) References Cited

U.S. PATENT DOCUMENTS

| | | | | |
|---|---|---|---|---|
| 6,151,025 A * | 11/2000 | Yen et al. | ............... | 345/418 |
| 6,184,889 B1 * | 2/2001 | D'Amora | ............... | 345/419 |
| 6,288,730 B1 * | 9/2001 | Duluk et al. | ............... | 345/552 |
| 6,496,608 B1 * | 12/2002 | Chui | ............... | 382/300 |
| 6,735,349 B1 * | 5/2004 | Agarwal et al. | ............... | 382/298 |
| 6,801,923 B2 * | 10/2004 | Peterson et al. | ............... | 708/313 |
| 6,879,328 B2 * | 4/2005 | Deering | ............... | 345/592 |
| 6,925,204 B2 * | 8/2005 | Ito | ............... | 382/162 |
| 6,999,087 B2 * | 2/2006 | Lavelle et al. | ............... | 345/543 |
| 7,023,438 B2 * | 4/2006 | Lokovic et al. | ............... | 345/426 |
| 7,091,983 B1 * | 8/2006 | Donovan | ............... | 345/582 |
| 7,136,071 B1 * | 11/2006 | Donovan et al. | ............... | 345/582 |
| 7,149,369 B2 * | 12/2006 | Atkins | ............... | 382/299 |
| 2005/0007477 A1 * | 1/2005 | Ahiska | ............... | 348/335 |

* cited by examiner

*Primary Examiner*—Jin-Cheng Wang
(74) *Attorney, Agent, or Firm*—Patterson & Sheridan, LLP

(57) ABSTRACT

Systems and methods for performing data array resizing using a graphics processor resize a source data array of any dimensions to produce a destination data array of other dimensions. A pixel shader program may be used to configure the graphics processor to sample and filter the source data array to produce the destination data array. One or more destination data arrays may be mip maps of the source data array. A box filter or other type of filter may be used to produce each destination data array. Each pixel in the destination data array is produced in isolation, i.e., independently, thereby permitting the use of parallel processing to produce each pixel in the destination data array.

13 Claims, 12 Drawing Sheets

PIXEL SHADER-BASED DATA ARRAY RESIZING

BACKGROUND OF THE INVENTION

1. Field of the Invention

Embodiments of the present invention generally relate to computer graphics, and more particularly to filtering texture map data.

2. Description of the Related Art

Conventional graphics processors are exemplified by systems and methods developed to read data stored in texture maps, texels. Conventionally, texture maps are down-sampled to produce a sequence of mip maps, where each mip map is half the size, in each dimension, of the previous data array in the sequence. For example, a 16×8 image is down-sampled to produce an 8×4, 4×2, 2×1, and 1×1 sequence of mip map images.

Some graphics processors may be configured to generate down-sampled mip maps for images where each dimension is a power-of-two. Specifically, a dimension, n, that is a power-of-two may be expressed as $n=2^i$, where i is an integer. More recently, graphics processors may read data from texture maps that have at least one dimension that is not a power-of-two. However, those same graphics processors are not able to generate down-sampled mip maps for those non-power-of-two dimension images.

FIG. 1A illustrates a prior art mapping of source image pixels in source image 100 to destination image pixels in destination image 110. Correct down-sampling of source image 100 to produce destination image 110 is straightforward since source image 100 and destination image 110 each have dimensions that are powers of two. Specifically, each pixel, e.g., pixel 101, pixel 102, pixel 103, and pixel 104, is scaled by 0.25 (25%) and summed to produce a single pixel, e.g., destination image 110.

Correct down-sampling of non-power-of-two dimension source images is more complicated since there is not a uniform mapping of pixels in the source image to pixels in the destination image. For example, naively using bilinear filtering to produce a destination pixel for every four source pixels undersamples the source image, resulting in a poor quality destination image.

FIG. 1B illustrates a prior art mapping of a 3×3 source image 120 to a 1×1 destination image 130. Bilinearly filtering pixels 111, 112, 114, and 115 of source image 120 produces an undersampled destination image 130. All nine pixels of source image 120 should be filtered to produce a correctly downsampled (high quality) destination image 130.

Accordingly, there is a need for efficient resizing of images, particularly for the generation of mip mapped texture maps based on non-power-of-two source images, to produce high quality downsampled images.

SUMMARY OF THE INVENTION

The current invention involves systems and methods for performing data array, e.g., image, resizing using a graphics processor to resize a source data array of any dimensions to produce a destination data array of other dimensions. A pixel shader program may be used to configure the graphics processor to sample and filter the source data array to produce the destination data array. One or more destination data arrays may be mip maps of the source data array. A box filter or other type of filter may be used to produce each destination data array. Each entry, e.g., pixel, in the destination data array is produced in isolation, i.e., independently, thereby permitting the use of parallel processing to produce each entry in the destination data array.

Various embodiments of a method of the invention for resizing a non-power-of-two dimension source data array to produce a destination data array include computing a box corresponding to a entry in the destination data array mapped onto the non-power-of-two dimension source data array, obtaining a first source sample, obtaining additional source samples, and filtering the first source sample and the additional source samples to produce the destination sample for the entry in the destination data array. The first source sample corresponds to a first region of the non-power-of-two dimension source data array that is within the box and the additional source samples correspond to additional regions of the non-power-of-two dimension source data array that is within the box.

Various embodiments of a computer-readable medium containing a program which, when executed by a computing device, performs a process of the invention for resizing a source data array to produce a destination data array. The process includes computing a box corresponding to an entry in the destination data array mapped onto the source data array to produce a portion of the source data array bounded by the box, dividing the portion of the source data array bounded by the box into regions, processing the regions independently to produce source samples, wherein each one of the source samples corresponds to a different one of the regions, and filtering the source samples to produce a destination sample for the pixel in the destination data array.

Various embodiments of the invention include a graphics processing system for resizing a source data array to produce a destination data array. The graphics processing system includes a texture fetch unit and a programmable shader computation unit. The texture fetch unit is configured to read one or more entries from the source data array, each of the one or more entries corresponding to a region of the source data array bounded by a box defined by a pixel of the destination data array mapped onto the source data array. the programmable shader computation unit is configured to compute a weight corresponding to the region and is configured to determine a source sample based on the one or more entries, scale the source sample by the weight to produce a weighted source sample, and combine the weighted source sample with other weighted source samples to produce a destination sample corresponding to the entry of the destination data array.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

A pixel shader program may be used to configure a graphics processor to sample and filter a source data array of any dimensions to produce a high-quality destination data array of other dimensions. The source and destination data arrays may include image data. One or more destination data arrays may be mip maps of the source data array and the filter may be a box filter or other type of filter, e.g., Gaussian, median, or the like. Each pixel in the destination data array is produced in isolation, i.e., independently. Therefore, source sample positions and weights are directly evaluated for each pixel in the destination data array, thereby permitting the use of parallel processing to produce each pixel in the destination data array. In contrast, conventional methods used to produce mip maps of non-power-of-two data arrays, incrementally compute source sample positions and weights incrementally, resulting in serialized generation of each pixel in the destination data array. Consequently, using direct evaluation to produce each pixel in the destination data array may result in higher performance than using incremental evaluation to produce each pixel in the destination data array.

Figure 1A:
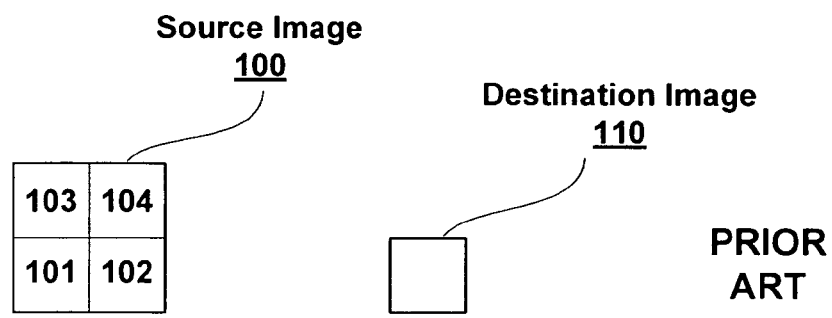
FIGS. 1A and 1B illustrate prior art mappings of source image pixels to destination image pixels.
Figure 1B:
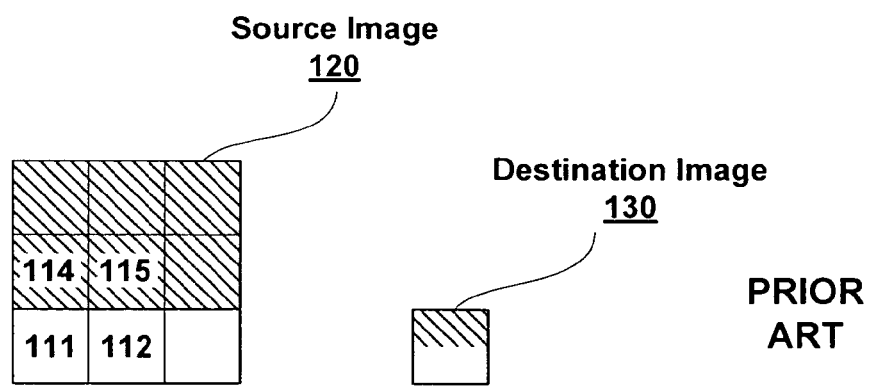
Figure 2A:
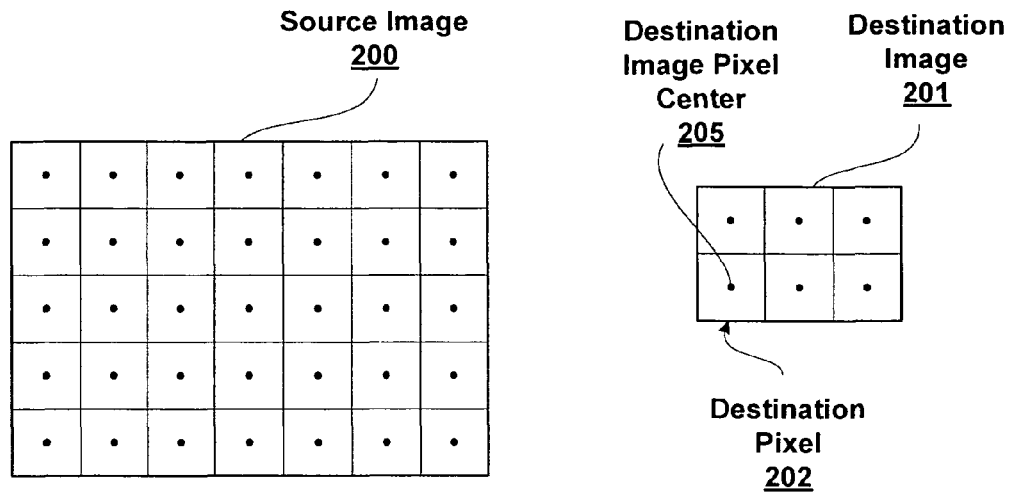
FIG. 2A illustrates a source image that is filtered to produce a destination image in accordance with one or more aspects of the present invention.

FIG. 2A illustrates a 7×5 source data array, source image 200, that is filtered to produce a 3×2 destination data array, destination image 201, in accordance with one or more aspects of the present invention. The "round down" convention, supported by conventional applications programming interfaces (APIs) such as the OpenGL® Shading Language and Direct3D® API, is used to determine the dimensions of destination image 201. When the round down convention is used, a dimension that is not an even number of pixels is halved and then rounded down to the nearest integer when a mip map is generated.

Figure 2B:
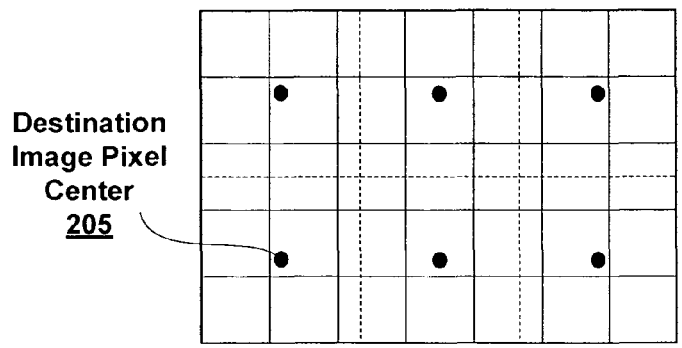
FIG. 2B illustrates a mapping of the source image pixels to the destination image pixels in accordance with one or more aspects of the present invention.

A pixel in destination image 201 is produced by weighting the value of each pixel in source image 200 that is "covered" by the pixel of destination image 201 mapped onto source image 200. Because destination image 201 is a downsampled version of source image 200, each pixel in destination image 201 covers or partially covers several pixels in source image 200. FIG. 2B illustrates a mapping of the entries of the source data array, pixels of source image 200, to the entries of the destination data array, pixels of destination image 201, including destination pixel 202 that corresponds to destination image pixel center 205, in accordance with one or more aspects of the present invention. The pixel centers of the destination pixels are shown as filled circles in FIG. 2B and the pixel centers of the source pixels shown in FIG. 2A have been omitted in FIG. 2B for the purposes of clarity.

Figure 2C:
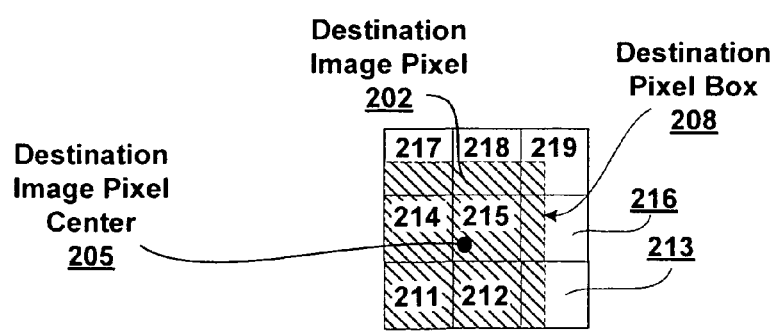
FIG. 2C illustrates the source image pixels shown in FIG. 2B that are filtered to produce a destination image sample in accordance with one or more aspects of the present invention.

FIG. 2C illustrates the source image pixels shown in FIG. 2B that are filtered to produce destination image pixel 202 that corresponds to destination image pixel center 205 in accordance with one or more aspects of the present invention. Nine source samples (pixels in source image space) are covered by at least a portion of a box bounding destination image pixel 202, destination pixel box 208. Specifically, source samples 211, 212, 213, 214, 215, 216, 217, 218, and 219 are each at least partially within destination pixel box 208. In order to produce a high-quality destination image, each of the nine source samples will contribute to destination image pixel 202. Destination pixel box 208 is effectively divided into two or more regions, where each region corresponds to a single source image pixel that is at least partially covered by destination image pixel 202. Each region includes at least a portion of a single source image pixel, but not more than the single source image pixel. A weight is computed for each of the nine samples, each sample is then scaled by its corresponding weight, and the weighted samples are summed to produce destination image pixel 202, as described in conjunction with FIG. 3.

Figure 2D:
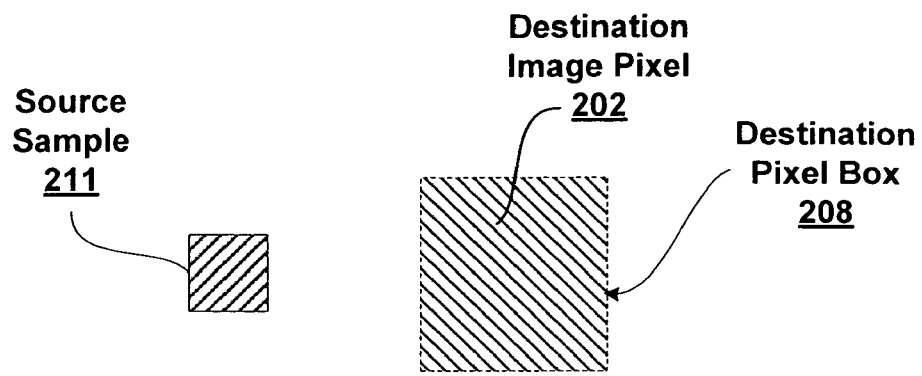
FIGS. 2D and 2E illustrate the area of source image regions compared with the area of the destination image pixel mapped onto the source image in accordance with one or more aspects of the present invention.

FIG. 2D illustrates the covered area of the source data array entry, source image sample 211, compared with the area of the destination pixel box 208 in accordance with one or more aspects of the present invention. The covered area of source image sample 211 lies within a first region of destination pixel box 208 and the first region includes all of source image sample 211. The weight computed for source image sample 211 is the ratio of the area of the first region, i.e, the covered area of source image sample 211, to the area of the destination pixel box 208.

Figure 2E:
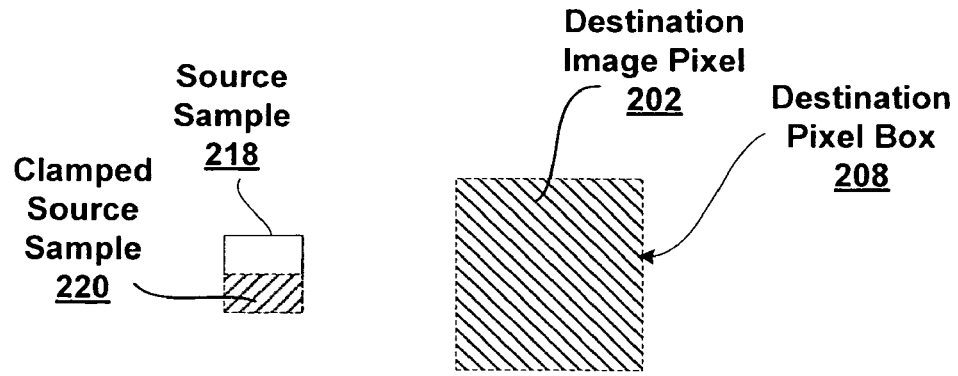

FIG. 2E illustrates the covered area of source sample 218 compared with the area of the destination data array entry, destination image pixel 202, in accordance with one or more aspects of the present invention. The covered area of source image sample 218 lies within a second region of destination pixel box 208 and the second region includes a portion of source sample 218. The weight computed for source sample 218 is the ratio of the area of the second region, i.e, the covered area of source sample 218, to the area of destination pixel box 208. Therefore, source sample 218 will contribute to the value of destination image pixel 202 less than source sample 211 which is fully covered by destination pixel box 208. Furthermore, if conventional bilinear interpolation is used to produce destination image pixel 202, then only four of the nine source samples would contribute to the value of destination image pixel 202, resulting in a lower quality destination image 201.

Figure 3:
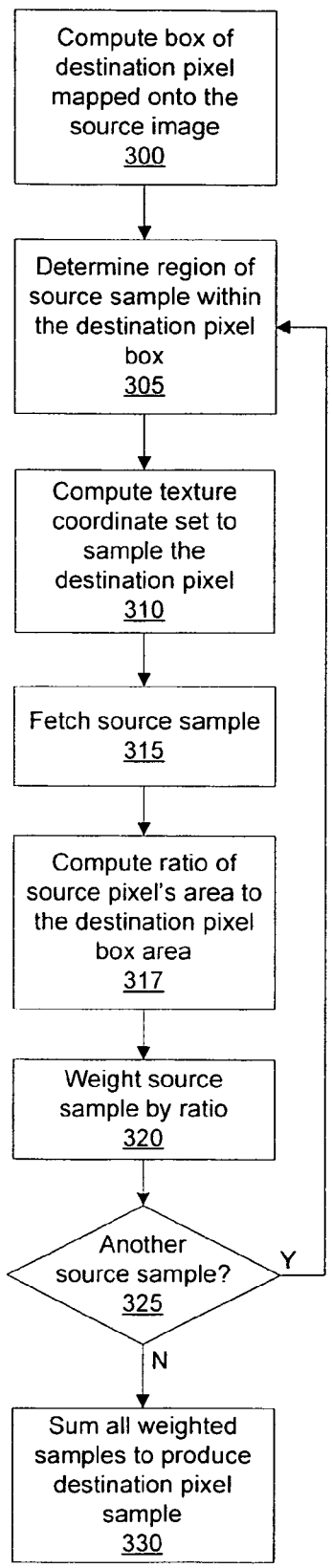
FIG. 3 illustrates an embodiment of a method for filtering source image samples to produce a destination image sample in accordance with one or more aspects of the present invention.

FIG. 3 illustrates an embodiment of a method for filtering source data array entries, source image samples, to produce a destination data array entry, such as destination image pixel 202, in accordance with one or more aspects of the present invention. The steps of this method may be repeated for each destination pixel to produce a complete destination image. Furthermore, this method may be embodied within a pixel shader program that, when executed by a graphics processor, is configured to perform direct evaluation to produce each pixel in the destination image. In some embodiments of the present invention, the graphics processor processes two or more destination image pixels in parallel to further improve image resizing performance.

In step 300 a box, such as destination pixel box 208, bounding a destination image pixel, such as destination image pixel 202, that is mapped onto the source image is computed. In some embodiments of the present invention, a screen-aligned rectangle of the destination image is generated by a pixel shader program and the output of the program is a correctly filtered destination sample for each destination image pixel. Specifically, the rectangle has two sets of texture coordinates, e.g., s, t, r, or the like. A first set of texture coordinates is assigned with (0,0) in the lower-left corner of the rectangle and (dstWidth, dstHeight) in the upper-right corner, where dstWidth and dstHeight are the width and height, respectively, of the destination image in pixels. The second set of texture coordinates is assigned with (1,1) in the lower-left corner of the rectangle and (dstWidth+1, dstHeight+1) in the upper-right corner. The destination image pixel in the lower-left corner of the destination image is bounded by a box defined by the texture coordinates (0,0) from the first set of texture coordinates and (1,1) from the second set of texture coordinates. The box may be mapped into the source image space by scaling each s texture coordinate by a width scale factor, srcWidth/dstWidth, and scaling each t texture coordinate by a height scale factor, srcHeight/dstHeight, where srcWidth and srcHeight are the width and height, respectively, of the source image in pixels. A box bounding a particular destination pixel mapped onto a source image, such as destination pixel box 208, may be computed by scaling the texture coordinates defining the destination image pixel by the width and height scale factors.

In step 305 a region of a particular source sample within the destination pixel box is determined. Specifically, the source sample's bounding box is clamped to lie within the destination pixel box. In some embodiments of the present invention, each source sample within the destination pixel box corresponds to a set of source sample coordinates, (i,j) defining the position of the source sample within the destination pixel box. The region corresponding to each source sample is determined by clamping each source sample's bounding box to the destination pixel box. Each sample's bounding box is defined by adding the source sample coordinates, (i,j) and (i+1, j+1) to the lower-left position of the box mapped into the source image space.

In step 310 a texture coordinate set is computed to sample the destination pixel. The texture coordinate set is used to determine an address for the source sample. In step 315 the source sample is fetched from a memory storing the source image. In some embodiments of the present invention, a center of the source sample's bounding box is converted to normalized coordinates, using techniques known to those skilled in the art. The normalized coordinates are used to compute an address for reading the source sample from the source image. Rather than using trilinear or bilinear filtering to process each source sample, each source sample is fetched without combining it with other source samples, i.e. only the nearest source sample is fetched.

The number of source samples used to compute each destination pixel mapped onto the source image is n*m where n=ceil (srcWidth/dstWidth)+1 and m=ceil (srcHeight/dstWidth)+1. As many as an extra n+m+1 source samples may be fetched in order to avoid razor's edge and bleeding conditions that may reduce the quality of destination images. Specifically, source samples that are partially covered are included and source samples that are not covered are scaled by zero. When the round down convention is used to generate a destination image that is a mip map of the source image, the number of source samples used to compute each destination pixel mapped onto the source image may be reduced to no more than nine without introducing razor's edge or bleeding conditions.

In step 317 the ratio of the clamped source sample's bounding box to the area the region determined in step 305 that corresponds to the clamped source sample's bounding box is computed. In step 320 the fetched source sample is scaled by a filter coefficient, e.g., the ratio computed in step 317. In step 325, the method determines if another source sample lies at least partially within the destination pixel box, and, if so, steps 305, 310, 315, and 320 are repeated to produce another weighted source sample. Otherwise, the method proceeds directly to step 330. In step 330 all of the weighted source samples are summed to produce a weighted sum corresponding to the particular destination data array entry, e.g., destination pixel sample. The weighted sum filters the source image using a box filter. In other embodiments of the present invention, other filter types may be used to resize the source image, such as, but not limited to a Gaussian filter, median filter, or the like. Persons skilled in the art will appreciate that any system configured to perform the method steps of FIG. 3 or its equivalent, is within the scope of the present invention.

Figure 4A:
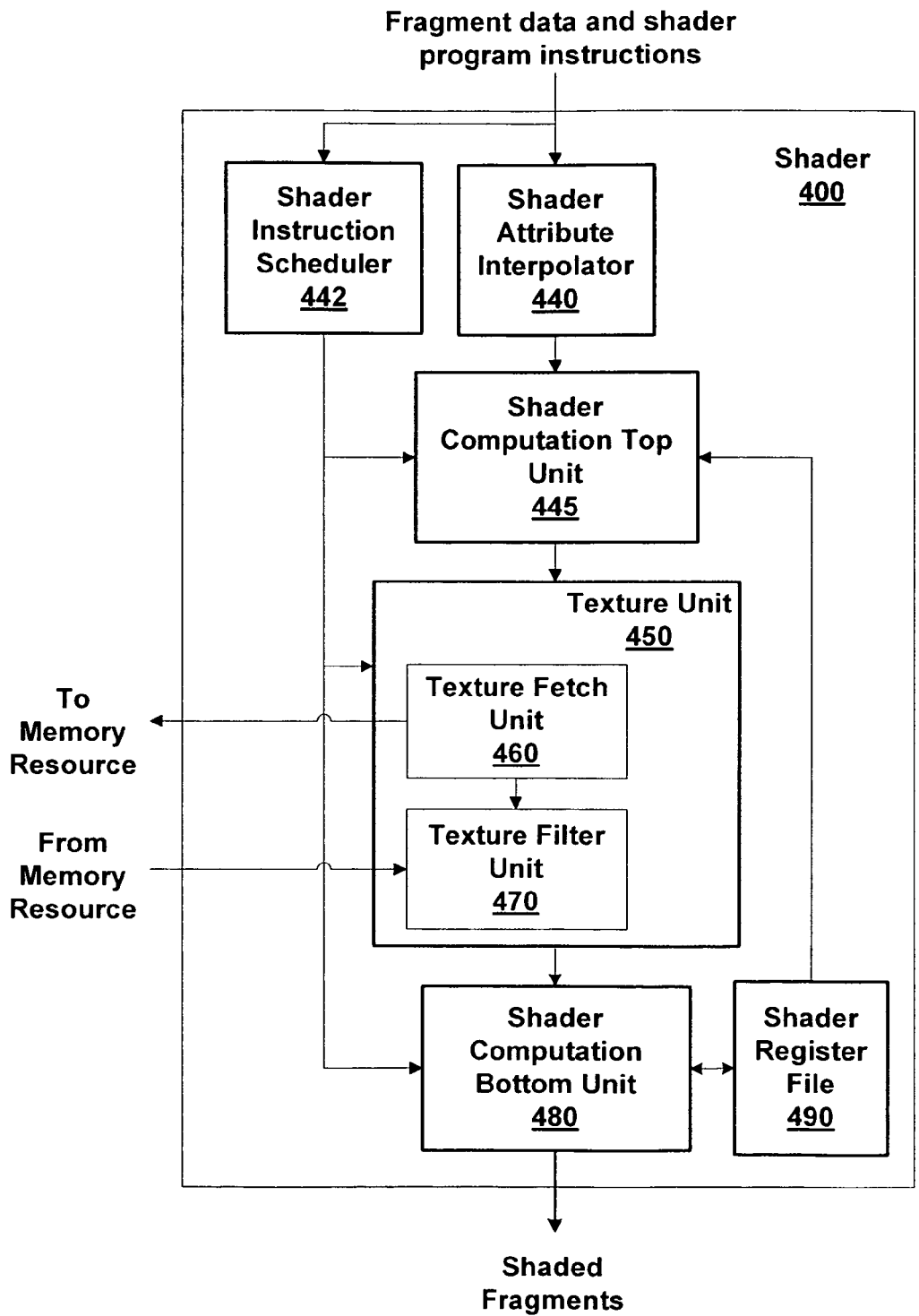
FIG. 4A is a block diagram of an exemplary embodiment of a shader in accordance with one or more aspects of the present invention.

FIG. 4A is a block diagram of an exemplary embodiment of a shader in accordance with one or more aspects of the present invention. One or more shader 400 may be included within a graphics processor and each shader 400 is configured to receive shader program instructions and fragment data. The fragment data are processed according to the shader program instructions to produce shaded fragments. Each shader 400 includes an interface to a memory resource, e.g., cache, random access memory (RAM), register file, or the like, for reading source image data. Shader 400 outputs shaded fragments, such as destination pixels. When multiple shaders 400 are included in a graphics processor, another unit (not shown) may be used to reorder the shaded fragments as needed.

A shader instruction scheduler 442 receives sequences of pixel shader program instructions and schedules each program instruction for execution by a processing unit in a processing pipeline, such as a shader attribute interpolator 440, a shader computation top unit 445, a texture unit 450, or a shader computation bottom unit 480. In some embodiments of the present invention, the sequences of pixel shader program instructions are read by shader instruction scheduler 445 from the memory resource.

Shader attribute interpolator 440 produces interpolated attributes, such as texture coordinates, barycentric coefficients, depth (z or w), or the like, that may be sourced by the other processing units within shader 400. A programmable shader computation unit, Shader computation top unit 440, performs floating point computations such as perspective correction of the interpolated attributes and other operations requiring division and multiplication. Texture unit 450 includes a texture fetch unit 460 and a texture filter unit 470. Texture fetch unit 460 computes addresses corresponding to source data array entries, source samples, and fetches source data array data stored in the memory resource. The source samples may be stored as a texture map, mip mapped or not. Texture filter unit 470 receives the source samples, and filters the source samples to produce destination data array data. Another programmable shader computation unit, Shader computation bottom unit 480, receives the destination data array data and interpolated attributes from texture unit 450 and produces shaded fragments using techniques known to those skilled in the art. A shader register file 490 is a storage resource used to store temporary values needed during execution of the pixel shader programs.

Each processing unit within shader 400 is configured to execute specific program instructions. Shader instruction scheduler 442 schedules execution of each program instruction for execution by a processing unit that is configured to perform the operation(s) specified by the program instruction. For example, shader attribute interpolator 440 may be configured to perform operations including multiplication, division, and reciprocal. Texture unit 450 may be configured to perform operations including derivative calculations, texture addressing, and interpolation, e.g., bilinear and trilinear filtering. Shader computation bottom unit 480 may be configured to perform floating point operations including addition, clamping, cosine, sine, dot product, logarithm, reciprocal, and multiplication. In other embodiments of the present invention, additional processing units may be included in shader 400.

Figure 4B:
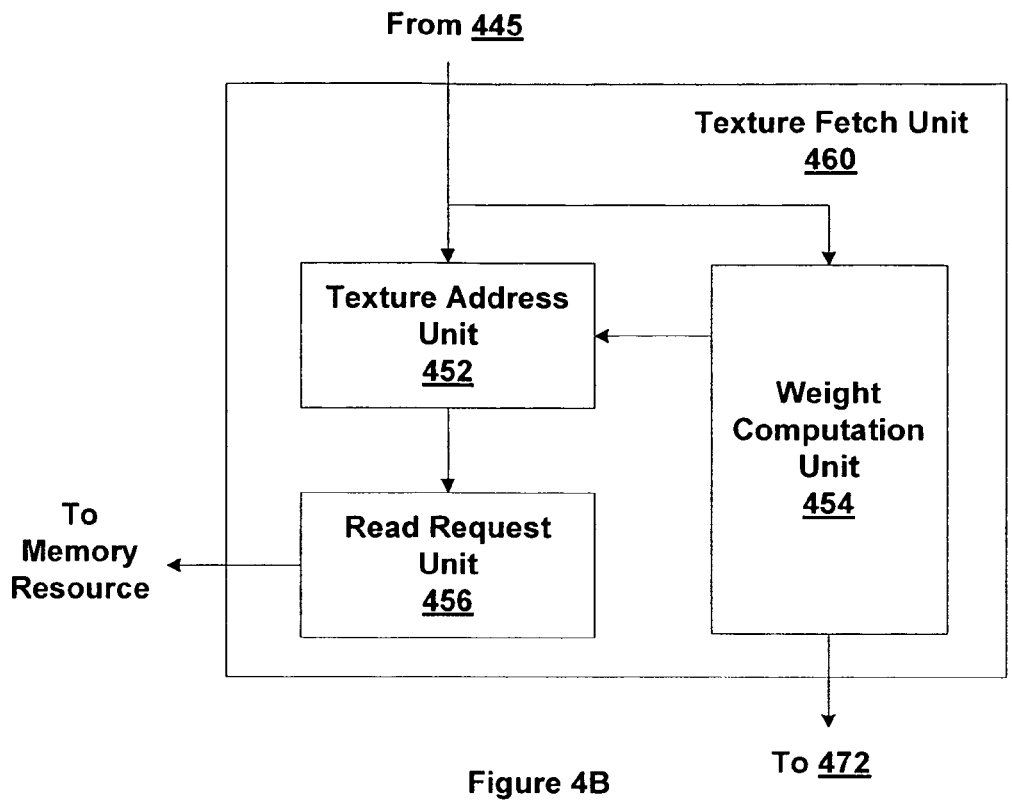
FIG. 4B is a block diagram of an exemplary embodiment of the texture fetch unit from FIG. 4A in accordance with one or more aspects of the present invention.

FIG. 4B is a block diagram of an exemplary embodiment of texture fetch unit 460 shown in FIG. 4A in accordance with one or more aspects of the present invention. In some embodiments, texture fetch unit 460 receives data, e.g., program instructions, and attributes associated with fragments (coverage information, texture identifiers, texture coordinates such as s, t, and r, and the like) from a rasterizer, as described in conjunction with FIG. 8.

Texture fetch unit 460 includes a texture address unit 452, a read request unit 456, and a texture configuration unit 454. Weight computation unit 454 computes the boxes bounding the destination data array entries, e.g., pixels, mapped onto the source data array, the destination pixel boxes, and provides texture address unit 452 with the source sample position information, such as the texture coordinate sets for each destination pixel box and the width and height scale factors. In some embodiments of the present invention, shader computation top unit 445 computes the texture coordinate sets. Texture address unit 452 uses the texture coordinate sets and width and height scale factors to determine the number of source samples to fetch for each destination data array entry, e.g., destination image pixel. Texture address unit 452 also computes a level of detail (LOD) for mip mapped textures and the texture coordinates are used to compute an address for reading source samples from source data arrays stored in the memory resource. Read request unit 456 generates source sample read requests to fetch source samples from the memory resource.

Weight computation unit 454 clamps each source sample's box to the corresponding destination pixel box to compute the source sample regions. Weight computation unit 454 then computes areas of the source sample regions and the areas destination pixel boxes. Weight computation unit 454 divides areas of the source sample regions by the areas of the destination pixel boxes to compute the weight for each of the source samples. The weights are output by weight computation unit 454 to texture filter unit 470. In other embodiments of the present invention weight computation unit 454 is omitted and the texture coordinate sets and weights are computed by shader computation top unit 445 and/or shader computation bottom unit 480.

Figure 4C:
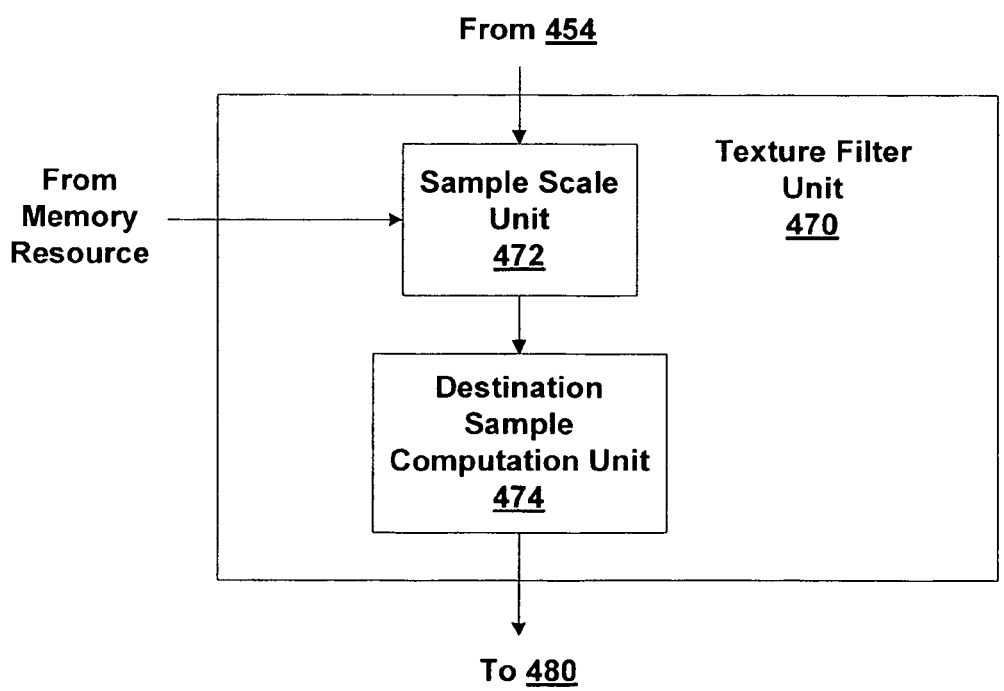
FIG. 4C is a block diagram of an exemplary embodiment of the texture filter unit from FIG. 4A in accordance with one or more aspects of the present invention.

FIG. 4C is a block diagram of an exemplary embodiment of texture filter unit 470 shown in FIG. 4A in accordance with one or more aspects of the present invention. Texture filter unit 470 includes a sample scale unit 472 and a destination sample computation unit 474. Sample scale unit 472 receives source samples from the memory resource and weights from weight computation unit 454. In some embodiments of the present invention the weights may be scaled by filter tap values to for a particular filter. For example, when box filtering is used the weight is scaled by a filter tap value of one to produce a filter coefficient. Sample scale unit 472 scales each source samples by its corresponding weight or filter coefficient to produce weighted source samples that are output to destination sample computation unit 474. Destination computation unit 474 sums all of the weighted samples corresponding to each destination data array entry and outputs the destination data array entries to shader computation bottom unit 480. In some embodiments of the present invention, shader computation bottom unit 480 and/or shader computation top unit 445 may be configured to perform the scaling and summing to produce the destination data array entries. In those embodiments of the present invention, sample scale unit 472 and destination computation unit 474 may be omitted.

The method described in conjunction with FIG. 3 and systems described in conjunction with FIGS. 4, 4A, and 4B may be used to resize source data arrays to produce high-quality destination data arrays using various types of filters. The source sample positions and weights are directly evaluated for each pixel in the destination data array, thereby permitting the use of parallel processing to produce each pixel in the destination data array. Conventional graphics processors are designed to efficiently perform bilinear interpolation of source samples. Therefore, it may be advantageous to leverage the bilinear filtering capabilities to obtain bilinear source samples and produce high-quality destination images, rather than using nearest sampling to obtain each source sample. When bilinear filtering is used to obtain a source sample the number fetched used to read source samples is reduced since each bilinear fetch reads four source samples arranged in a 2×2. Specifically, when 9 source samples are needed to produce a destination sample, 4 bilinear fetches are needed instead of 9 nearest fetches. When 16 source samples are needed to produce a destination sample, 4 bilinear fetches are needed instead of 16 nearest fetches. Therefore, bilinear filtering may be used to reduce the number of fetches used to obtain the source samples.

Figure 5A:
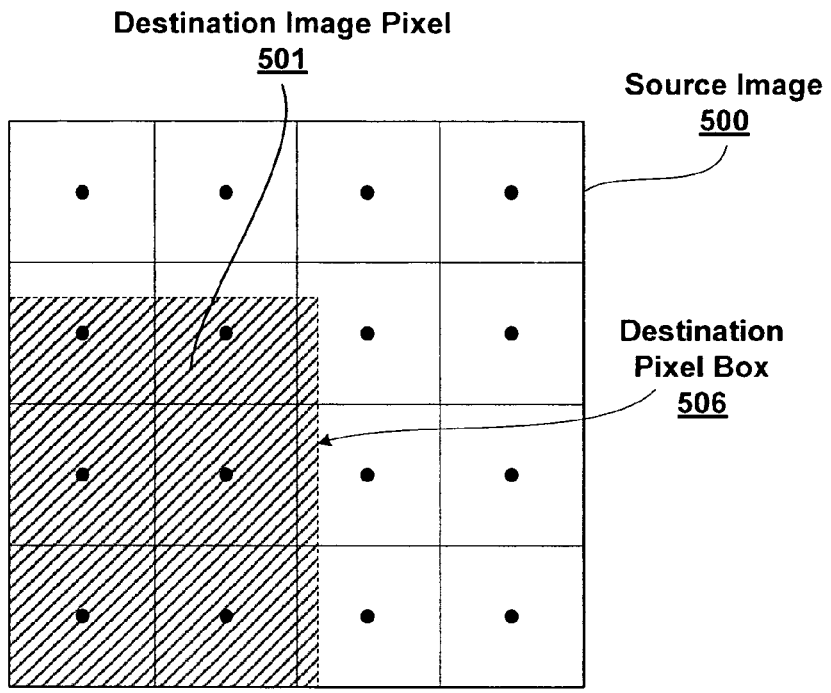
FIG. 5A illustrates another mapping of source image pixels to a destination image pixel in accordance with one or more aspects of the present invention.
Figure 5B:
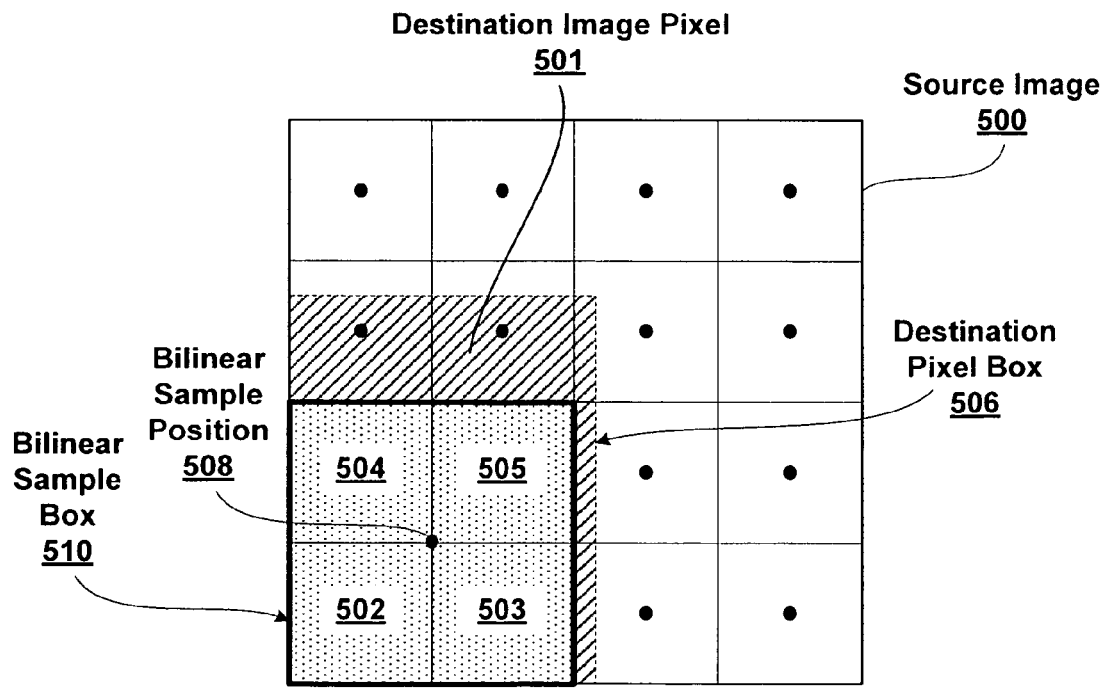
FIGS. 5B, 5C, 5D, and 5E illustrate source image samples shown in FIG. 5A that are filtered to produce bilinear box samples in accordance with one or more aspects of the present invention.

FIG. 5A illustrates another mapping of source data array entries, e.g., source image pixels, in source image 500 to a destination data array entry, e.g., destination image pixel 501, in accordance with one or more aspects of the present invention. The pixel centers of the source pixels are shown as filled circles. FIG. 5B illustrates a bilinear source sample box 510 including source samples 502, 503, 504, and 505, within destination image pixel 501 in accordance with one or more aspects of the present invention. Destination pixel box 506 is effectively divided into two or more regions, where each region corresponds to a bilinear sample box including four source samples, such as bilinear sample box 510 including source samples 502, 503, 504, and 505. Each bilinear sample box is at least partially covered by destination image pixel 501. A weight is computed for each of the four bilinear sample boxes, and a bilinear source sample is computed for each bilinear sample box. Each bilinear source sample is then scaled by its corresponding weight, and the weighted samples are summed to produce destination pixel 501, as described in conjunction with FIG. 6.

Because all four source samples are completely covered by destination image pixel 501, the center of a bilinear sample box 510 coincides with bilinear sample position 508. The bilinear sample position is positioned at the approximate center of the covered portion of bilinear sample box 510. Therefore, the bilinear source sample corresponding to bilinear sample position 508 is computed with equal contributions of 25% from each source sample 502, 503, 504, and 505. Likewise, a first region of the box bounding destination image pixel 501 includes source samples 502, 503, 504, and 505. The weight corresponding to bilinear sample position 508 is computed as a ratio of the area of the first region to the area destination pixel box 506.

Figure 5C:
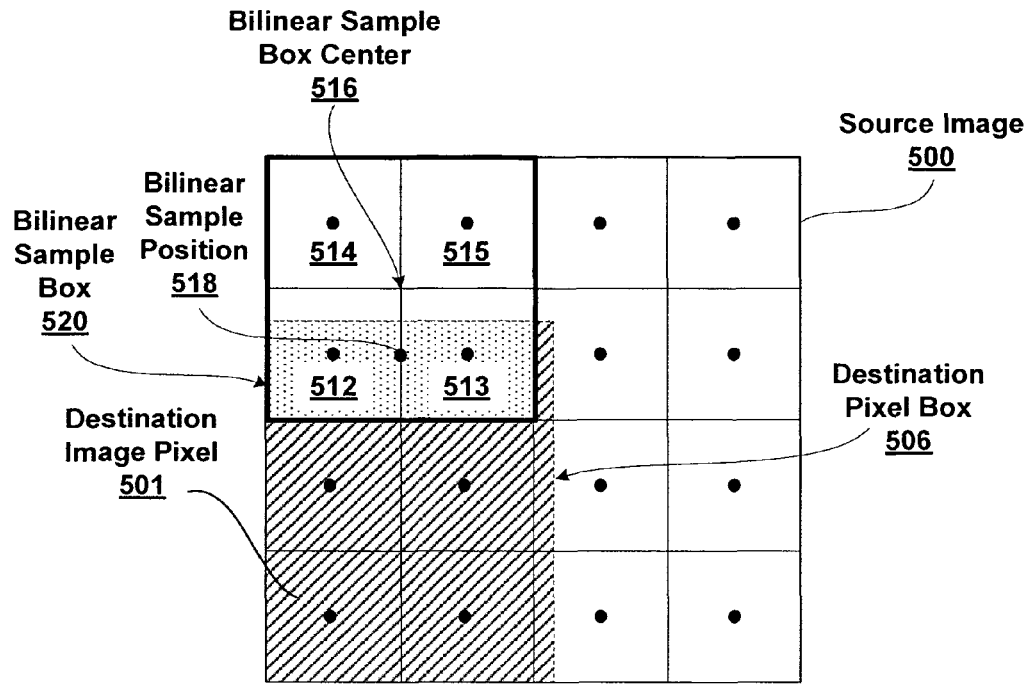

FIG. 5C illustrates a second bilinear source sample box, bilinear source sample box 520, including source samples 512, 513, 514, and 515, within destination image pixel 501 in accordance with one or more aspects of the present invention. A second region of the box bounding destination image pixel 501 corresponds to the portion of bilinear sample box 520 that is covered by destination image pixel 501.

Because the four source samples 512, 513, 514, and 515 are not completely covered by destination image pixel 501, the center of bilinear sample box 520 does not coincide with bilinear sample position 518. Bilinear sample position 518 is positioned at the approximate center of the covered portion of bilinear sample box 520, between source samples 512 and 513. Therefore, the bilinear source sample corresponding to bilinear sample position 518 is computed with equal contributions of 50% from each source sample 512 and 513. The weight corresponding to bilinear sample position 518 is computed as a ratio of the area of the second region to the area of destination pixel box 506.

Figure 5D:
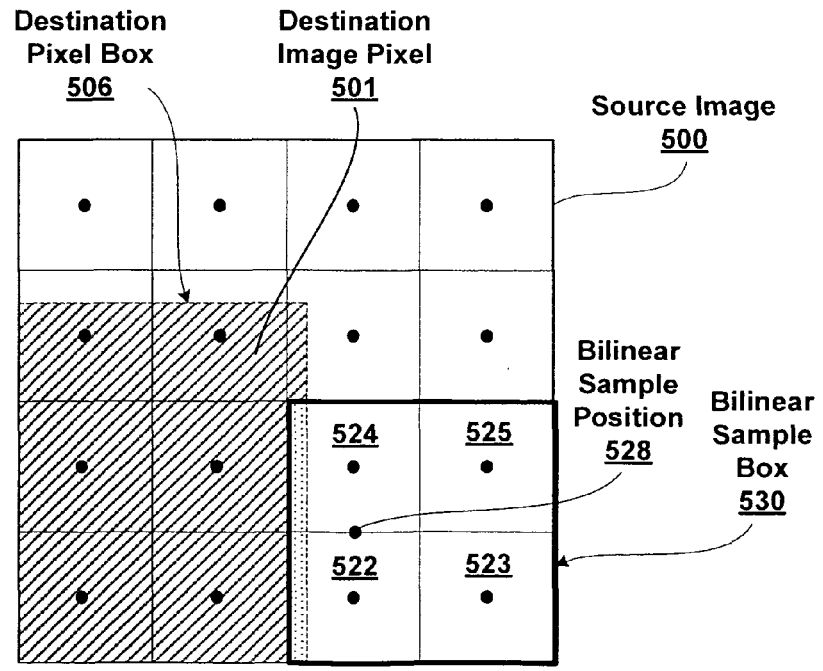

FIG. 5D illustrates a third bilinear source sample box, bilinear source sample box 530, including source samples 522, 523, 524, and 525, within destination image pixel 501 in accordance with one or more aspects of the present invention. A third region of destination pixel box 506 corresponds to the portion of bilinear sample box 530 that is covered by destination image pixel 501.

Because the four source samples 522, 523, 524, and 525 are not completely covered by destination image pixel 501, the center of bilinear sample box 530 does not coincide with bilinear sample position 528. Bilinear sample position 528 is positioned at the approximate center of the covered portion of bilinear sample box 530, between source samples 522 and 524. Therefore, the bilinear source sample corresponding to bilinear sample position 528 is computed with equal contributions of 50% from each source sample 522 and 524. The weight corresponding to bilinear sample position 528 is computed as a ratio of the area of the third region to the area of destination pixel box 506.

Figure 5E:
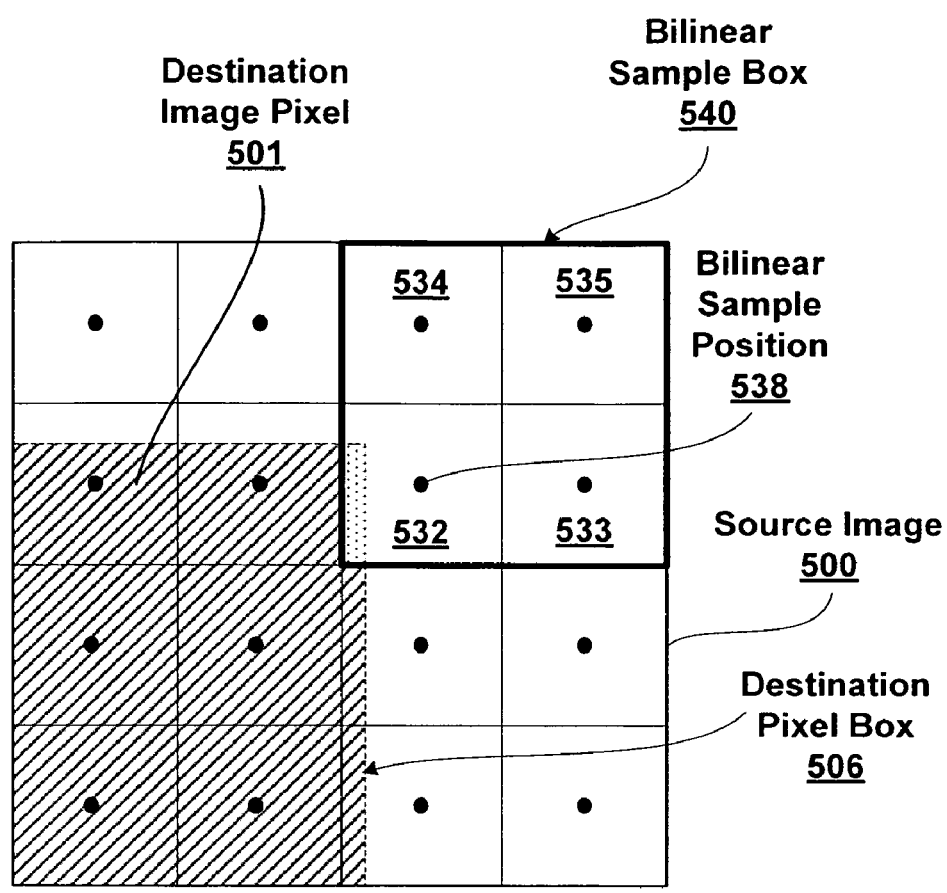

FIG. 5E illustrates a fourth bilinear source sample box, bilinear source sample box 540, including source samples 532, 533, 534, and 535, within destination image pixel 501 in accordance with one or more aspects of the present invention. A fourth region of the box bounding destination image pixel 501 corresponds to the portion of bilinear sample box 540 that is covered by destination image pixel 501.

Because the four source samples 532, 533, 534, and 535 are not completely covered by destination image pixel 501, the center of bilinear sample box 540 does not coincide with bilinear sample position 538. Bilinear sample position 538 is positioned at the approximate center of the covered portion of bilinear sample box 540, the center of sample 532. Therefore, the bilinear source sample corresponding to bilinear sample position 538 is computed as source sample 532. The weight corresponding to bilinear sample position 538 is computed as a ratio of the area of the fourth region to the area of destination pixel box 506. The four computed bilinear source samples are scaled by their corresponding weights and summed to produce the destination sample corresponding to destination image pixel 501, as described in conjunction with FIG. 6.

Figure 6:
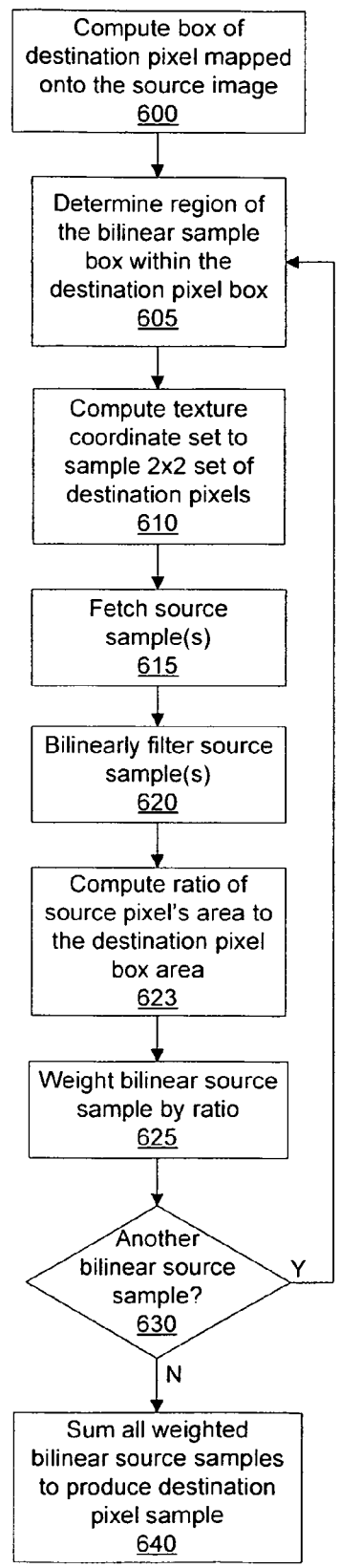
FIG. 6 illustrates another embodiment of a method for filtering source image samples to produce a destination image sample in accordance with one or more aspects of the present invention.

FIG. 6 illustrates another embodiment of a method for filtering source data array entries, e.g., source image samples, to produce a destination data array entry, e.g., destination pixel sample, in accordance with one or more aspects of the present invention. The steps of this method may be repeated for each destination pixel to produce a complete destination image. Furthermore, this method may be embodied within a pixel shader program that, when executed by a graphics processor, is configured to perform direct evaluation to produce each entry in the destination data array. In some embodiments of the present invention, the graphics processor processes two or more destination data array entries in parallel to further improve data array resizing performance.

In step 600 a box, such as destination pixel box 506, bounding a destination image pixel, such as destination image pixel 501, mapped onto the source image is computed as previously described in conjunction with step 300 of FIG. 3. In step 605 a region of a particular bilinear source sample is determined. The region is within the within destination pixel box 506. Specifically, the bilinear source sample's bounding box is clamped to lie within destination pixel box 506.

In step 610 a texture coordinate set is computed to sample a 2×2 group of destination pixels to provide proper bilinear weighting of the source samples. The bilinear weighting matches the ratio of the coverage of the bilinear source sample's bounding box within destination pixel box 506. The texture coordinate set is used to determine an address for the source sample. In step 615 the source samples needed to compute the bilinear source sample are fetched from the memory storing the source image. In step 620 the source samples are bilinearly interpolated to produce the bilinear source sample. In step 623 the ratio of the area of the region determined in step 605 that corresponds to the clamped bilinear source sample's bounding box, and the area of destination pixel box 506 is computed. In step 625 the bilinear source sample is scaled by a filter coefficient, e.g., the weight computed in step 623. In step 630, the method determines if another bilinear source sample lies at least partially within destination pixel box 506, and, if so, steps 605, 610, 615, 620, and 625 are repeated to produce another weighted bilinear source sample. Otherwise, the method proceeds directly to step 640. In step 640 all of the weighted bilinear source samples are summed to produce a weighted sum corresponding to the particular destination pixel sample. The weighted sum filters the source image using an approximation of a box filter. Persons skilled in the art will appreciate that any system configured to perform the method steps of FIG. 6 or its equivalent, is within the scope of the present invention.

Figure 7A:
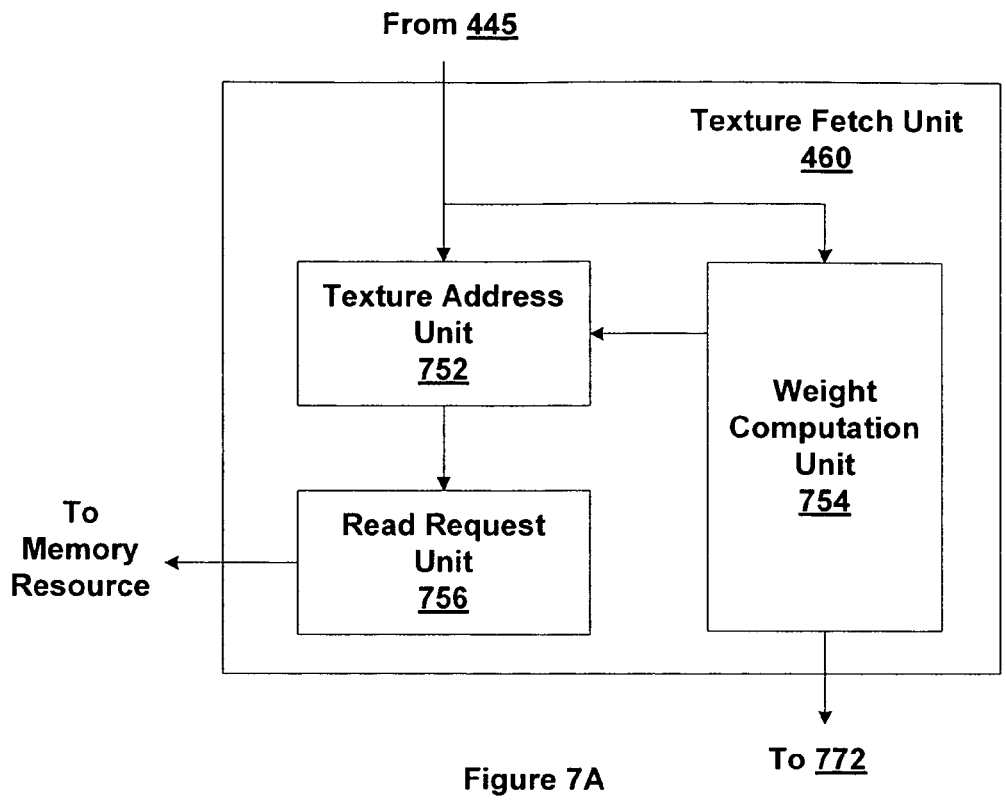
FIG. 7A is a block diagram of another exemplary embodiment of the texture fetch unit from FIG. 4A in accordance with one or more aspects of the present invention.

FIG. 7A is a block diagram of another exemplary embodiment of texture fetch unit 460 from FIG. 4A in accordance with one or more aspects of the present invention. In this embodiment of the present invention, texture fetch unit 460 includes a texture address unit 752, a read request unit 456, and a weight computation unit 454. Weight computation unit 454 computes the destination pixel boxes and provides texture address unit 752 with the bilinear source sample position information, such as the texture coordinate sets for each bilinear box and width and height scale factors. In some embodiments of the present invention, shader computation top unit 445 computes the texture coordinate sets, providing for proper bilinear weighting of the source samples to match the ratio of the bilinear source sample region with the destination pixel box. Texture address unit 752 uses the texture coordinate sets and width and height scale factors to determine the number of source samples to fetch for each destination image pixel. Texture address unit 752 also computes a LOD for mip mapped textures and the texture coordinates are used to compute an address for reading source samples from source data arrays stored in the memory resource. Read request unit 756 generates source sample read requests to fetch source samples from the memory resource.

Weight computation unit 754 also computes the boxes bounding the destination pixels mapped onto the source data array. Weight computation unit 754 clamps each bilinear source sample's box to the destination pixel boxes to compute the bilinear source sample regions. Weight computation unit 754 then computes areas of the bilinear source sample regions and the areas of the destination pixel boxes. Weight computation unit 754 divides areas of the bilinear source sample regions by the areas of the destination pixel boxes to compute the weight for each of the bilinear source samples. The weights are output by weight computation unit 754 to texture filter unit 770. In other embodiments of the present invention weight computation unit 754 is omitted and the texture coordinate sets and weights are computed by shader computation top unit 445 and/or shader computation bottom unit 480.

Figure 7B:
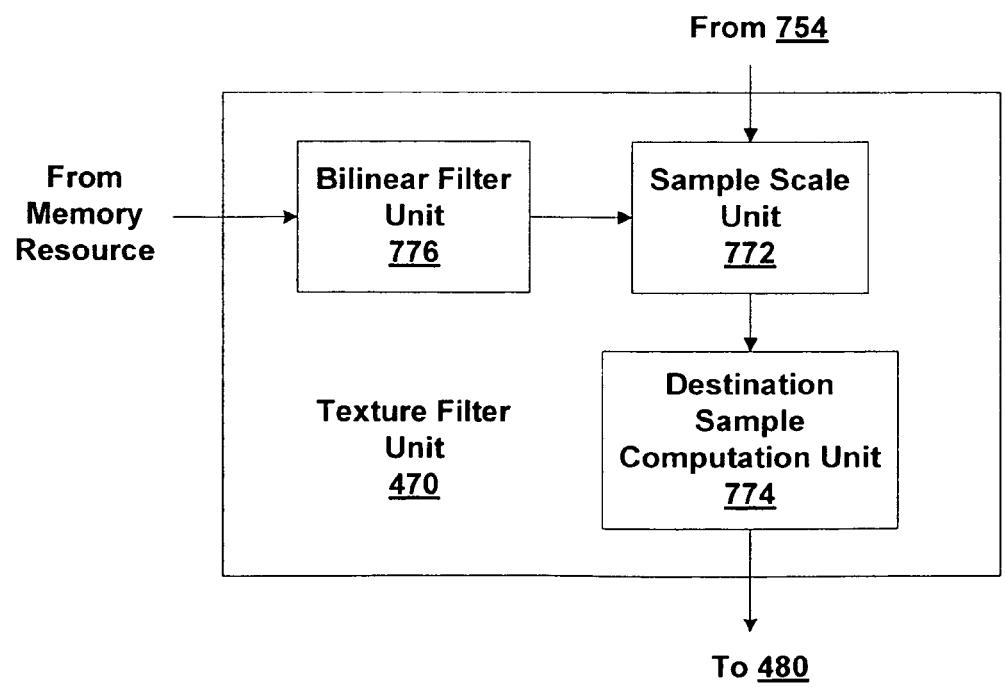
FIG. 7B is a block diagram of another exemplary embodiment of the texture filter unit from FIG. 4A in accordance with one or more aspects of the present invention.

FIG. 7B is a block diagram of another exemplary embodiment of the texture filter unit 470 from FIG. 4A in accordance with one or more aspects of the present invention. In this embodiment of the present invention, texture filter unit 470 includes a bilinear filter unit 776, sample scale unit 772, and a destination sample computation unit 774. Bilinear filter unit 776 receives the source samples fetched from the memory resource and computes a bilinear source sample for each bilinear sample box. Bilinear filter unit 776 outputs the bilinear source samples to sample scale unit 772.

Sample scale unit 772 receives weights from weight computation unit 754. Sample scale unit 772 scales each bilinear source sample by its corresponding weight, using the weight as a filter coefficient, to produce weighted bilinear source samples that are output to destination sample computation unit 774. Destination computation unit 774 sums all of the weighted bilinear source samples corresponding to each destination data array entry and outputs the destination data array entries to shader computation bottom unit 480. In some embodiments of the present invention, shader computation bottom unit 480 and/or shader computation top unit 445 may be configured to perform the scaling and summing to produce the destination data array entries. In those embodiments of the present invention, sample scale unit 772 and destination computation unit 774 may be omitted.

Figure 8:
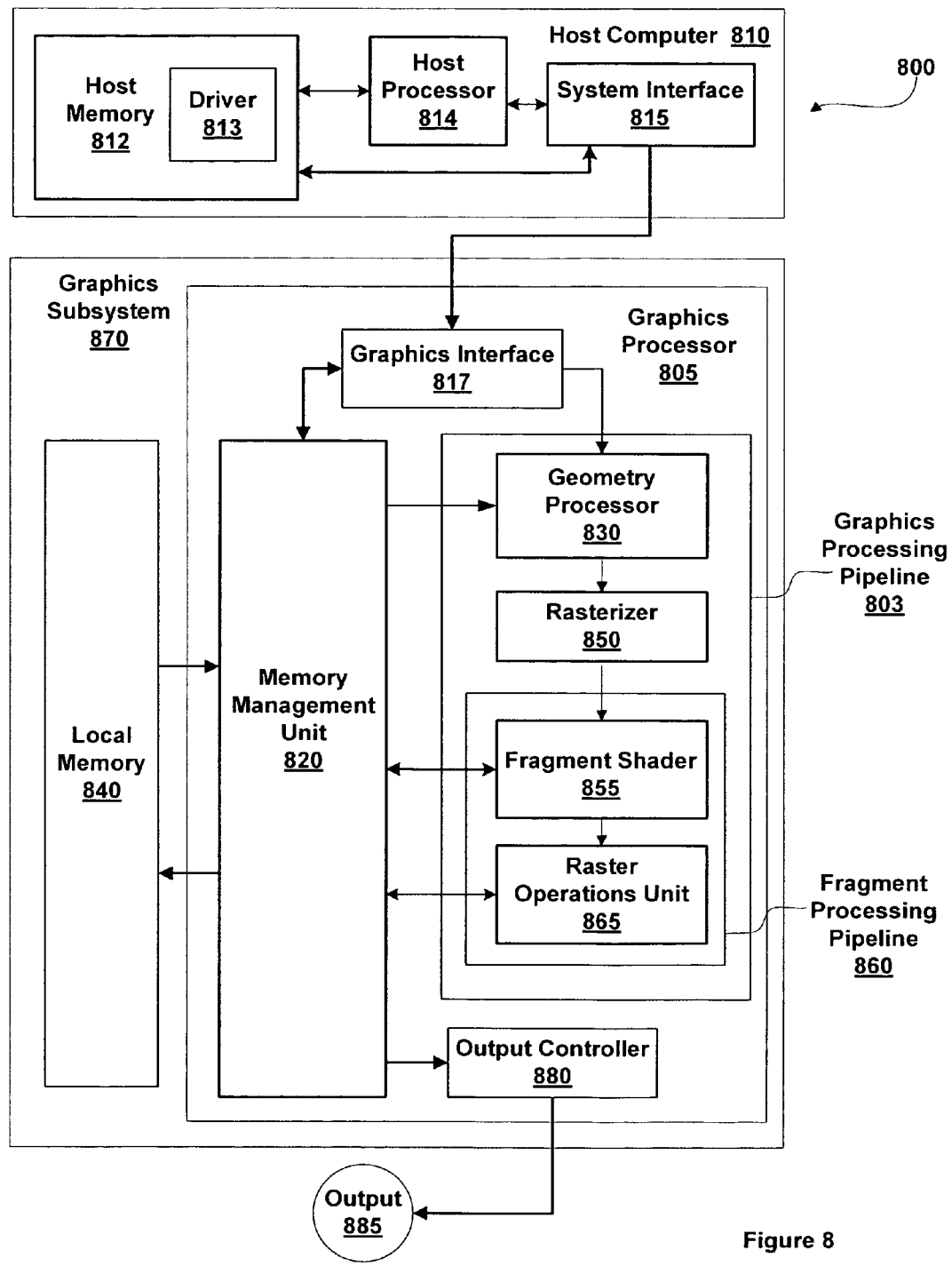
FIG. 8 is a block diagram of an exemplary embodiment of a computing system in accordance with one or more aspects of the present invention.

FIG. 8 is a block diagram of an exemplary embodiment of a respective computer system, including a host computer 810 and a graphics subsystem 870, in accordance with one or more aspects of the present invention. Computing system 800 may be a desktop computer, server, laptop computer, palm-sized computer, tablet computer, game console, portable wireless terminal such as a PDA or cellular telephone, computer based simulator, or the like. Host computer 810 includes host processor 814 that may include a system memory controller to interface directly to host memory 812 or may communicate with host memory 812 through a system interface 815. System interface 815 may be an I/O (input/output) interface or a bridge device including the system memory controller to interface directly to host memory 812. An example of system interface 815 known in the art includes Intel® Northbridge.

A graphics device driver, driver 813, interfaces between processes executed by host processor 814, such as application programs, and a programmable graphics processor 805, translating program instructions as needed for execution by programmable graphics processor 805. Driver 813 also uses commands to configure sub-units within programmable graphics processor 805.

Graphics subsystem 870 includes a local memory 840 and programmable graphics processor 805. Host computer 810 communicates with graphics subsystem 870 via system interface 815 and a graphics interface 817 within programmable graphics processor 805. Data, program instructions, and commands received at graphics interface 817 can be passed to a graphics processing pipeline 803 or written to a local memory 840 through memory management unit 820. Programmable graphics processor 805 uses memory to store graphics data, including source data array data, destination data array data, texture maps, and program instructions, where graphics data is any data that is input to or output from computation units within programmable graphics processor 805. Graphics memory is any memory used to store graphics data or program instructions to be executed by programmable graphics processor 805. Graphics memory can include portions of host memory 812, local memory 840 directly coupled to programmable graphics processor 805, storage resources coupled to the computation units within programmable graphics processor 805, and the like. Storage resources can include register files, caches, FIFOs (first in first out memories), and the like.

In addition to Interface 817, programmable graphics processor 805 includes a graphics processing pipeline 803, a memory controller 820 and an output controller 880. Data and program instructions received at interface 817 can be passed to a geometry processor 830 within graphics processing pipeline 803 or written to local memory 840 through memory controller 820. In addition to communicating with local memory 840, and interface 817, memory controller 820 also communicates with graphics processing pipeline 803 and output controller 880 through read and write interfaces in graphics processing pipeline 203 and a read interface in output controller 880.

Within graphics processing pipeline 803, geometry processor 830 and a programmable graphics fragment processing pipeline, fragment processing pipeline 860, perform a variety of computational functions. Some of these functions are table lookup, scalar and vector addition, multiplication, division, coordinate-system mapping, calculation of vector normals, tessellation, calculation of derivatives, interpolation, filtering, and the like. Geometry processor 830 and fragment processing pipeline 860 are optionally configured such that data processing operations are performed in multiple passes through graphics processing pipeline 803 or in multiple passes through fragment processing pipeline 860. Each pass through programmable graphics processor 805, graphics processing pipeline 803 or fragment processing pipeline 860 concludes with optional processing by a raster operations unit 865.

Vertex programs are sequences of vertex program instructions compiled by host processor 814 for execution within geometry processor 830 and rasterizer 850. Shader programs are sequences of shader program instructions compiled by host processor 814 for execution within fragment processing pipeline 860. Geometry processor 830 receives a stream of program instructions (vertex program instructions and shader program instructions) and data from interface 817 or memory controller 820, and performs vector floating-point operations or other processing operations using the data. The program instructions configure subunits within geometry processor 830, rasterizer 850 and fragment processing pipeline 860. The program instructions and data are stored in graphics memory, e.g., portions of host memory 812, local memory 840, or storage resources within programmable graphics processor 805. When a portion of host memory 812 is used to store program instructions and data the portion of host memory 812 can be uncached so as to increase performance of access by programmable graphics processor 805. Alternatively, configuration information is written to registers within geometry processor 830, rasterizer 850 and fragment processing pipeline 860 using program instructions, encoded with the data, or the like.

Data processed by geometry processor 830 and program instructions are passed from geometry processor 830 to a rasterizer 850. Rasterizer 850 is a sampling unit that processes primitives and generates sub-primitive data, such as fragment data, including parameters associated with fragments (texture identifiers, texture coordinates, and the like). Rasterizer 850 converts the primitives into sub-primitive data by performing scan conversion on the data processed by geometry processor 830. Rasterizer 850 outputs fragment data and shader program instructions to fragment processing pipeline 860. The fragment data includes a coverage mask for each pixel group that indicates which pixels within the pixel group are covered by the fragment.

The shader programs configure the fragment processing pipeline 860 to process fragment data by specifying computations and computation precision. Fragment shader 855 is optionally configured by shader program instructions such that fragment data processing operations are performed in multiple passes within fragment shader 855. Fragment shader 855 may include one or more shaders 400.

Fragment shader 855 outputs the shaded fragment data, e.g., color and depth, and codewords generated from shader program instructions to raster operations unit 865. Raster operations unit 865 includes a read interface and a write interface to memory controller 820 through which raster operations unit 865 accesses data stored in local memory 840 or host memory 812. Raster operations unit 865 optionally performs near and far plane clipping and raster operations, such as stencil, z test, blending, and the like, using the fragment data and pixel data stored in local memory 840 or host memory 812 at a pixel position (data array entry specified by x,y coordinates) associated with the processed fragment data. The output data from raster operations unit 865 is written back to local memory 840 or host memory 812 at the pixel position associated with the output data and the results, e.g., destination data array data are saved in graphics memory.

When processing is completed, an output 885 of graphics subsystem 870 is provided using output controller 880. Alternatively, host processor 814 reads the data array stored in local memory 840 through memory controller 820, interface 817 and system interface 815. Output controller 880 is optionally configured by opcodes to deliver data to a display device, network, electronic control system, other computing system 800, other graphics subsystem 870, or the like.

While the foregoing is directed to embodiments of the present invention, other and further embodiments of the invention may be devised without departing from the basic scope thereof, and the scope thereof is determined by the claims that follow. The foregoing description and drawings are, accordingly, to be regarded in an illustrative rather than a restrictive sense. The listing of steps in method claims do not imply performing the steps in any particular order, unless explicitly stated in the claim.

All trademarks are the respective property of their owners.

The invention claimed is:

1. A method of resizing a non-power-of-two dimension source data array associated with a source image to produce a destination data array associated with a destination image, the method comprising:

mapping a box reflecting the size of a first destination pixel in the destination image onto a portion of the non-power-of-two dimension source data array, wherein the portion of the non-power-of-two dimension source data array includes a set of source pixels in the source image, and wherein each source pixel in the set of source pixels is at least partially covered by the box;

computing a texture coordinate set associated with the first destination pixel;

determining texture coordinates of a first source sample corresponding to a first region in the portion of the non-power-of-two dimension source data array based on the texture coordinate set, wherein the first source sample relates to at least one source pixel included in the first region;

obtaining, with a texture fetch unit, the first source sample from memory based on the texture coordinates of the first source sample;

computing a first filter coefficient associated with the first source sample based on a ratio of the area of the first region and the total area of the portion of the non-power-of-two dimension source data array;

filtering the first source sample based on the first filter coefficient to produce a first weighted source sample;

obtaining an additional source sample corresponding to an additional region in the portion of the non-power-of-two dimension source data array, wherein additional source sample is based on at least one source pixel included in the additional region; computing a second filter coefficient associated with the additional source sample based on a ratio of the area of the additional region and the total area of the portion of the non-power-of-two dimension source data array;

filtering the additional source sample based on the additional filter coefficient to produce an additional weighted source sample; and summing the first weighted source sample and the additional weighted source sample to produce a destination sample associated with the first destination pixel.

2. The method of claim 1, wherein the steps of computing, mapping, obtaining, filtering, and summing are performed for another destination pixel in the destination data array to produce the destination data array.

3. The method of claim 1, wherein the first source sample corresponds to a single entry of the non-power-of-two dimension source data array.

4. The method of claim 1, wherein the first source sample corresponds to four entries of the non-power-of-two dimension source data array.

5. The method of claim 4, wherein the step of obtaining the first source sample includes bilinearly filtering source samples corresponding to the four entries to produce the first source sample.

6. The method of claim 1, wherein the destination data array is a mip map of the non-power-of-two dimension source data array.

7. A computer-readable storage medium containing a program which, when executed by a computing device, performs a process for resizing a source data array associated with a source image to produce a destination data array associated with a destination image, the process comprising:
   mapping a box reflecting a size of a first destination pixel in the destination image onto a portion of the source data array, wherein the portion of the source data array includes a set of source pixels in the source image, and wherein each source pixel in the set of source pixels is at least partially covered by the box;
   computing a texture coordinate set associated with the first destination pixel;
   determining texture coordinates of a first source sample corresponding to a first region in the portion of the non-power-of-two dimension source data array, wherein the first source sample relates to at least one source pixel included in the first region;
   obtaining the first source sample from memory based on the texture coordinates of the first source sample;
   computing a first filter coefficient associated with the first source sample based on a ratio of an area of the first region and a total area of the portion of the non-power-of-two dimension source data array;
   filtering the first source sample based on the first filter coefficient to produce a first weighted source sample;
   obtaining an additional source sample corresponding to an additional region, wherein the additional source sample is based on at least one source pixel included in the additional region;
   computing a second filter coefficient associated with the additional source sample based on a ratio of an area of the additional region and the total area of the portion of the source data array;
   filtering the additional source sample based on the additional filter coefficient to produce an additional weighted source sample; and
   summing the first weighted source sample and the additional weighted source sample to produce a destination sample associated with the first destination pixel.

8. The computer-readable storage medium of claim 7, wherein the process further comprises generating a mip map of the source data array in an OpenGL shading language context.

9. The computer-readable storage medium of claim 7, wherein the process further comprises generating a mip map of the source data array in a Direct3D applications programming interface context.

10. The computer-readable storage medium of claim 7, wherein the source data array has a width or a height that is not a power-of-two.

11. A graphics processing system for resizing a source data array associated with a source image to produce a destination data array associated with a destination image, the system comprising:
   a texture fetch unit, configured to:
      map a box reflecting a size of a first destination pixel in the destination image onto a portion of the non-power-of-two dimension source data array, wherein the portion of the non-power-of-two dimension source data array includes a set of source pixels in the source image, and wherein each source pixel in the set of source pixels is at least partially covered by the box,
      compute a texture coordinate set associated with the first destination pixel,
      determine texture coordinates of a first source sample corresponding to a first region in the portion of the non-power-of-two dimension source data array, wherein the first source sample relates to at least one source pixel included in the first region,
      obtain the first source sample from memory based on the texture coordinates of the first source sample, and
      obtain an additional source sample corresponding to an additional region, wherein the additional source sample is based on at least one source pixel included in the additional region; and a texture filter unit, configured to:
      compute a first filter coefficient associated with the first source sample based on a ratio of an area of the first region and a total area of the portion of the non-power-of-two dimension source data array, filter the first source sample based on the first filter coefficient to produce a first weighted source sample,
      compute a second filter coefficient associated with the additional source sample based on a ratio of an area of the additional region and the total area of the portion of the non-power-of-two dimension source data array,
      filter the additional source sample based on the additional filter coefficient to produce an additional weighted source sample, and
      sum the first weighted source sample and the additional weighted source sample to produce a destination sample associated with the first destination pixel.

12. The graphics processing system of claim 11, wherein the source data array has a width or a height that is not a power-of-two.

13. The graphics processing system of claim 11, wherein the texture fetch unit and the texture filter unit are included within a programmable graphics processor.

* * * * *